United States Patent
Fincher et al.

(10) Patent No.: US 6,449,019 B1
(45) Date of Patent: Sep. 10, 2002

(54) REAL-TIME KEY FRAME EFFECTS USING TRACKING INFORMATION

(75) Inventors: Thomas G. Fincher, Hudson; Robert A. Paoni, Nashua, both of NH (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/545,779

(22) Filed: Apr. 7, 2000

(51) Int. Cl.[7] .................................................. H04N 9/74
(52) U.S. Cl. ........................ 348/578; 348/169; 348/580; 348/584; 348/585; 345/475; 345/473
(58) Field of Search ...................................... 348/578, 579, 348/169, 584, 585, 586, 580, 583; 386/4, 52, 55, 64; 345/473, 474, 475; H04N 9/74

(56) References Cited

U.S. PATENT DOCUMENTS

| | | | |
|---|---|---|---|
| 5,644,364 A | 7/1997 | Kurtze et al. | |
| 5,786,824 A | 7/1998 | Sevigny | |
| 5,828,769 A | 10/1998 | Burns | |
| 5,845,009 A | 12/1998 | Marks et al. | |
| 5,929,836 A | * 7/1999 | Der et al. | 348/584 |
| 6,061,055 A | 5/2000 | Marks | |
| 6,084,588 A | 7/2000 | De Haan | |
| 6,097,853 A | * 8/2000 | Gu et al. | 382/282 |
| 6,164,221 A | 11/2000 | Gangnet | |
| 6,198,873 B1 | * 3/2001 | Takano | 348/705 |
| 6,215,485 B1 | 4/2001 | Phillips | |
| 6,239,846 B1 | * 5/2001 | Billing | 348/578 |

FOREIGN PATENT DOCUMENTS

| | | |
|---|---|---|
| CA | 2 173 805 | 11/1997 |
| GB | 2 312 126 | 10/1997 |
| WO | WO 98/11512 | 3/1998 |

OTHER PUBLICATIONS

Heckbert, Paul S., "Fundamentals of Texture Mapping And Image Warping", Master's Thesis, Jun. 17, 1989, pp. 1–86.

* cited by examiner

Primary Examiner—John Miller
Assistant Examiner—Trang U. Tran
(74) Attorney, Agent, or Firm—Peter J. Gordon

(57) ABSTRACT

Real time effects are provided by using tracking information to define values for parameters of an effect. The tracking information also may be combined with parameters for various effects that operate on the position, rotation, scale, skew and perspective of objects in an image. The values defined for the parameters of an effect may be represented in a transformation matrix used in a real time digital video effects processor.

35 Claims, 5 Drawing Sheets

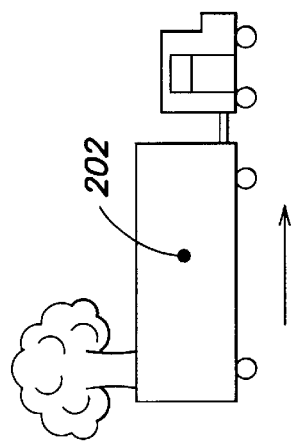
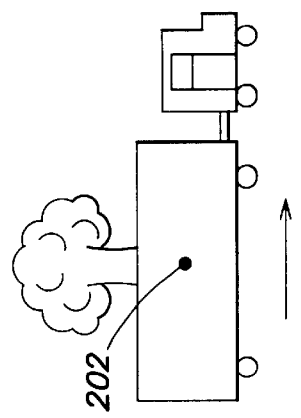
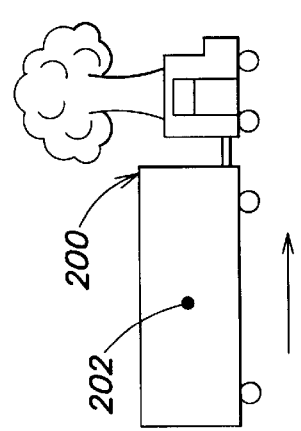
FIG. 2A  FIG. 2B  FIG. 2C
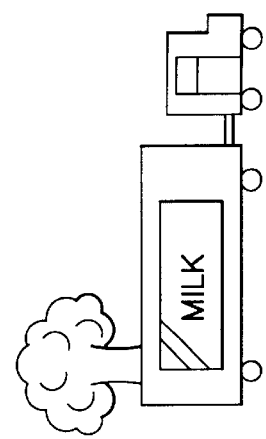
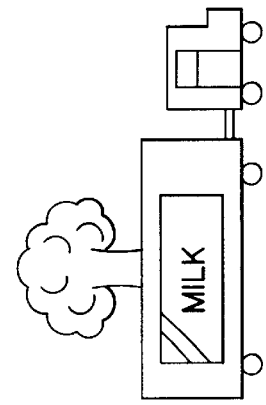
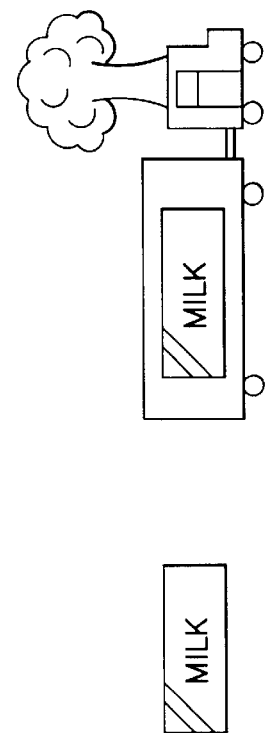
FIG. 3A  FIG. 3B  FIG. 3C  FIG. 3D

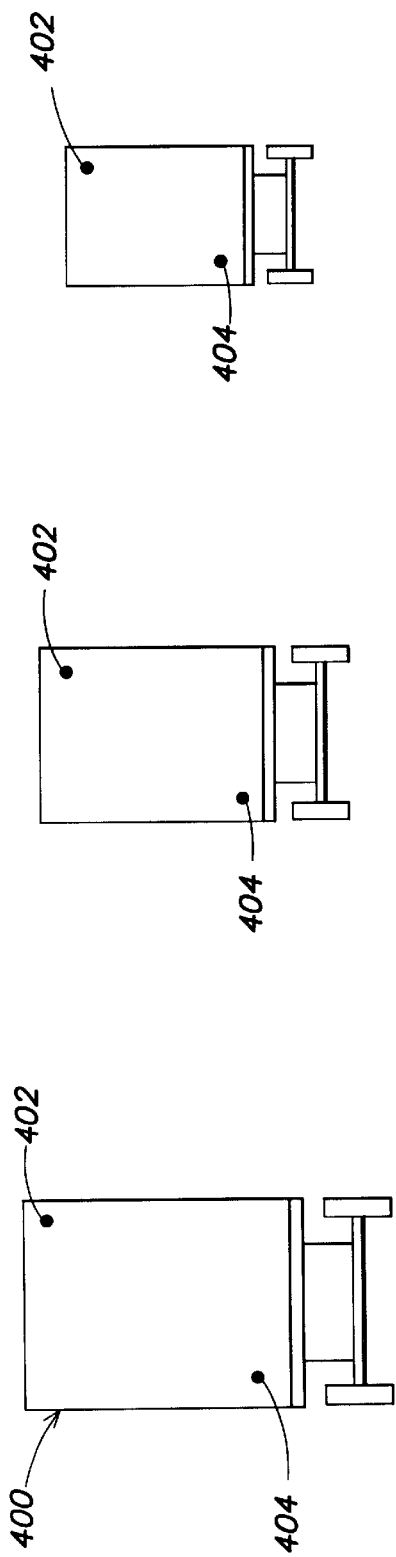
FIG. 4A  FIG. 4B  FIG. 4C
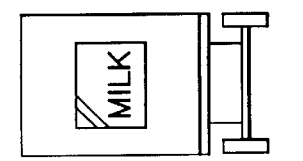
FIG. 5D
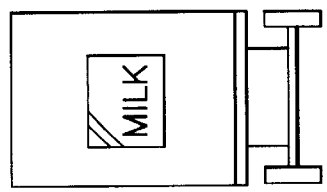
FIG. 5C
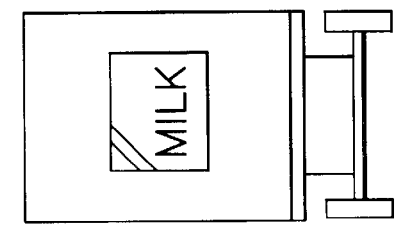
FIG. 5B
FIG. 5A

REAL-TIME KEY FRAME EFFECTS USING TRACKING INFORMATION

BACKGROUND

Video commonly is processed to create special effects by tracking an object in the video. For example, the video may be processed using the information about the tracked object to remove movement of the object (an effect called stabilization). An object also may be added to the video that has a position or movement related to the tracked object (an effect called compositing). An object that has a relationship with the tracked object also may be removed from the video (such as an effect called wire removal).

Video may be stabilized before compositing, wire removal or other effects are performed where the movement of objects in the video may impact the quality of the effect. The movement of the objects may be reintroduced into the video after the effect is performed by inverting the stabilization effect.

SUMMARY

Creating an effect using tracking and stabilization involves multiple operations to be performed on each image to produce the effect. These operations generally prevent such effects from being rendered in real time. The inability to view the effect in real time increases the cost incurred for each change made to the effect, which in turn limits the creativity of the editor.

Real time effects are provided by using tracking information to define values for parameters of an effect. The tracking information also may be combined with parameters for various effects that operate on the position, rotation, scale, skew and perspective of objects in an image. The values defined for the parameters of an effect may be represented in a transformation matrix used in a real time digital video effects processor.

Accordingly, in one aspect, effects may be generated in real time by key frames on video data comprising a sequence of images using tracking information. For each image that is not a key frame, one or more values for parameters are interpolated for the effect using the one or more values that are specified at the key frames. The tracking information is combined with the one or more interpolated values and the effect is performed on each image in the sequence of images in real time using the combined tracking information and one or more interpolated values.

BRIEF DESCRIPTION OF THE DRAWINGS

In the drawings,

FIG. 2 illustrates tracking a moving image for position;

FIG. 3 illustrates inserting a foreground object into a moving image using a position effect;

FIG. 4 illustrates tracking a moving image for scale;

FIG. 5 illustrates inserting a foreground object into a moving image using a scale effect;

DETAILED DESCRIPTION

Tracking involves analysis of movement of an object from one image to another in a sequence of images. An object's orientation in an image may be defined by one or more points. The transformation of the object over a sequence of images is recorded as a sequence of these one or more points. This sequence of one or more points is called tracking data or tracking information. Tracking data can be used for a variety of effects including object following, replacement of an object, stabilization, or other operations on objects in an image.

Effects defined using tracking data may be performed in real-time on a sequence of images. Real-time processing of an effect involves calculating values for parameters of the effect for each image and applying the effect to each image in time to display each image at its desired output rate without precomputing all of the images before initiating display of the sequence. One mechanism for real-time addition of digital video effects can be found in U.S. Pat. No. 5,654,737 (Der et al), in which real-time digital video effects are created using a media pipeline that provides two channels of input sequences of digital still images to a digital video effect processor. Because this system operates using a media pipeline which provides sequences of digital still images, rather than a video signal, display and generation of effects can be stopped at any time. Thus, an editor can stop and view an arbitrary pixel in the created effect. Also, an editor can step forward or backward, frame by frame, through the effect, by virtue of the pipelined nature of the system.

Figure 1:
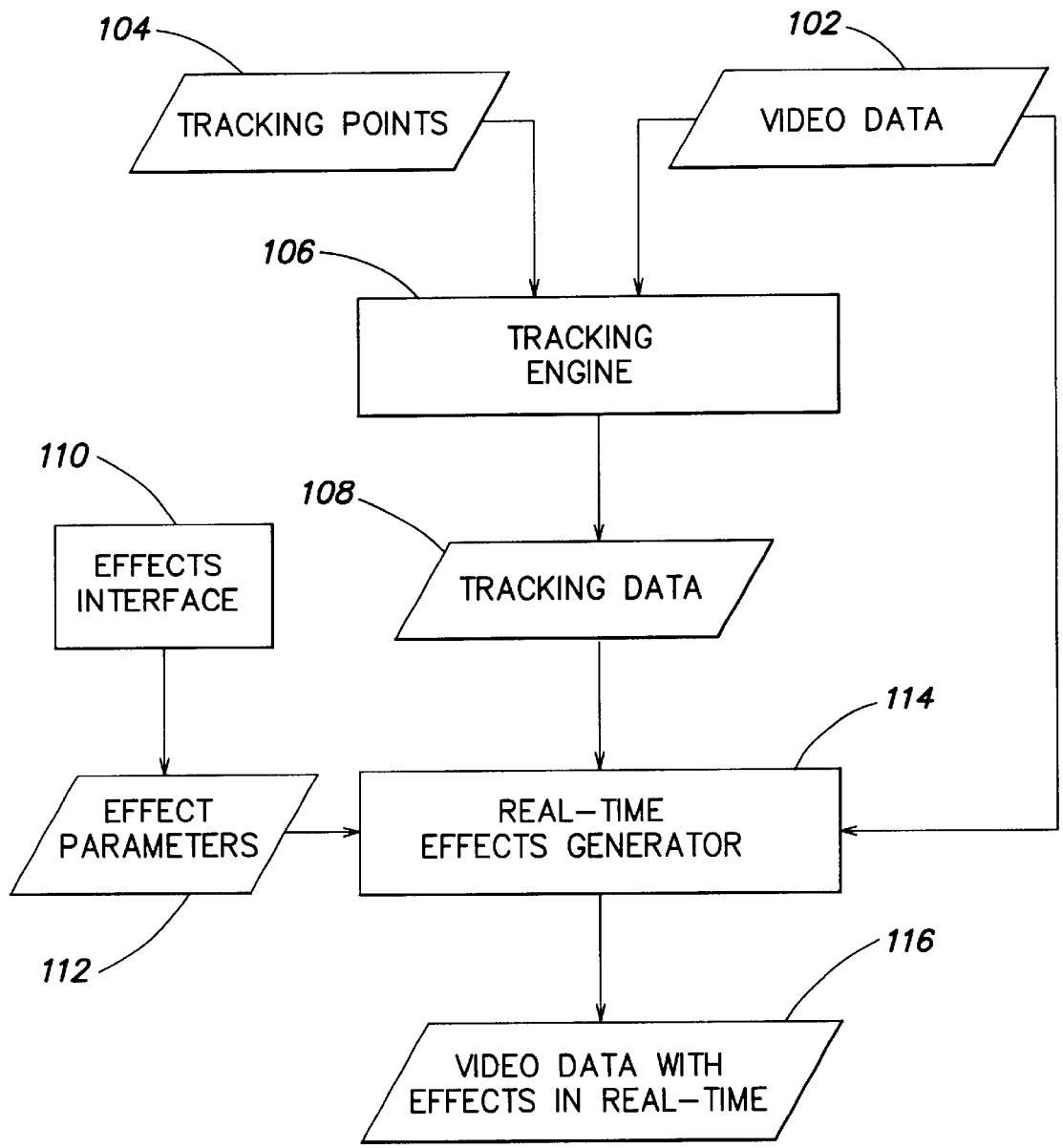
FIG. 1 is a block diagram of an example real time tracking and effects generator.

FIG. 1 is a dataflow diagram illustrating how tracking data may be used to perform effects in real-time. Video data 102 and initial tracking point(s) 104, which may be specified by, for example, an editor, are analyzed by a tracking engine 106 to yield the tracking data 108. The tracking system 106 may be implemented using any conventional or commercially available tracking engine.

An editor also may define an effect 112 to be performed on the video image. An effects interface 110 enables an editor to select an effect from numerous available effects and to specify values for parameters of the selected effect. The effects that may be defined using effects interface 110 include any operations that perform a spatial transformation on an object or an image or both. Examples of such effects include but are not limited to compositing, paint effects, color manipulations, picture-in-picture or key framed effects, pan and scan operations and the like.

Values for parameters of the effect 112 are combined with the tracking data 108 and video data 102 by a real-time effects generator 114. The real-time effects generator 114 then generates and displays the video data 116 with the effects in real-time. For example, tracking data may be used to define a picture-in-picture/3D warp effect. The 3D warp effect allows the use of multiple tracking points to cause a superimposed object or picture to appear as if it were part of the original scene.

Key frames are used to define values for parameters for operations on a sequence of images. Key frames specify values for initial, optionally selected intermediate and final images, leaving values for other images to be defined by interpolation. For example, the user selects a first frame and sets an initial value for each of one or more parameters. The user then selects a second frame and sets terminal values for the one or more parameters. Values for other frames are obtained by interpolating between the first frame and each subsequent key frame. This process of key framing may be used for a variety of desired effects. For example, a user may desire an object to change color from green to blue, or to increase in size from a first frame to a second frame. The user also may use key framing to composite a foreground image onto a background image. The user selects the starting point of the foreground image in the first frame and the ending point of the foreground image in the second frame. The intermediate frames are then interpolated so that the foreground image appears at the appropriate location on the background during the intermediate frames.

Tracking data may be combined with key frame data to perform, optionally in real time, effects in which an object follows a desired motion. A user sets an initial key frame to set the starting position of an object and then selects tracking data to move the object according to a tracked path of movement. This combination of key framing and tracking is done without having to match points of the foreground image to the background. The use of key frames and real-time tracking effects allows the tracking data points to be at any location on the moving image, not just at the corners of the object to be inserted. The key frame data defines an initial relationship between the foreground image and the background image, then the tracking data or transformation matrix is used to determine how the foreground image moves in relation to the background image in subsequent frames.

The number of tracking points used to insert a foreground object into a moving background depends on the complexity of the movement. If the movement only occurs in the horizontal and vertical plane without any rotation or scale a single tracking point may be used to follow the position of the background.

FIG. 2 shows a sequence of images of a truck 200 driving in the horizontal plane. Only one point 202 is used to track the truck's position. At the first image in the sequence, shown in FIG. 2A, the horizontal and vertical coordinates of the tracking point are stored as the reference point (RefPoint.h, RefPoint.v). For each subsequent field, shown in FIGS. 4B–4C, the coordinates of the tracking point are stored (pt.h, pt.v). This tracking data is obtained by the tracking engine. The tracking data is then used by the digital effects generator according to the effect desired.

To superimpose a foreground object (shown in FIG. 3A as a sign) onto the background the initial, optional intermediate and end values for the position of the foreground with respect to the background are first set at the key frames, as shown in FIG. 3B for a first key frame. Then the tracking data is applied to the foreground object so that the coordinates (x, y) of the foreground image are altered at each field according to the equation:

$$X = pt.h - \text{RefPoint}.h$$

$$Y = pt.v - \text{RefPoint}.v$$

This operation will result in the foreground object moving with the truck, as shown in FIGS. 3C–3D. If the desired effect was a stabilization of the truck rather than the compositing of an object, every image in the sequence would be altered according to the inverse of the truck's movement:

$$X = \text{RefPoint}.h - pt.h$$

$$Y = \text{RefPoint}.v - pt.v$$

To insert a foreground object into a moving background where scale is altered, as shown in FIG. 4 with the truck 400 driving away, two tracking points are used. The two points may be chosen anywhere in the moving background, but for better results should be far enough apart so they can adequately represent the change in scale. The initial coordinates of these points 402, 404 are stored as reference points (RefPoint1.h, RefPoint1.v, RefPoint2.h, RefPoint2.v). For each subsequent field, shown in FIGS. 6B–6C, the coordinates of these tracking points are stored (pt1.h, pt1.v, pt2.h, pt2.v). RefPoint1 and pt1 define a vector for how the first tracking point has changed from the initial field to the current field, and similarly for the second point with RefPoint2 and pt2. The motion of the first point is removed from second point to isolate the change in scale:

$$pt2.h = pt2.h + \text{RefPoint1}.h - pt1.h$$

$$pt2.v = pt2.v + \text{RefPoint1}.v - pt1.v$$

$$pt1.h = \text{RefPoint1}.h$$

$$pt1.v = \text{RefPoint1}.v.$$

To further isolate the change in scale between the tracking points any rotation effects between the points must be removed. The rotation is removed by adjusting the tracking data to compensate for any rotation, using the following equations:

$$\text{angle1} = \arctan gent((\text{RefPoint2}.v - \text{RefPoint1}.v)/(\text{Refpoint2}.h - \text{RefPoint1}.h))$$

$$\text{angle2} = \arctan gent((pt2.v - pt1.v)/(pt2.h - pt1.h))$$

if (angle1 is not equal to angle2)

$$r = \text{square root}((pt2.h - pt1.h)*(pt2.h - pt1.h) + (pt2.v - pt1.v)*(pt2.v - pt1.v))$$

$$pt2.h = pt1.h + r*\cos(\text{angle1})$$

$$pt2v. = pt1.v + r*\sin(\text{angle1}).$$

To scale an X coordinate, the following are used to compute the scale factor:

$$\text{delta1} = \text{RefPoint2}.h - \text{RefPoint1}.h$$

$$\text{delta2} = pt2.h - pt1.h.$$

To scale a Y coordinate, the following are used to compute the scale factor:

$$\text{delta1} = \text{RefPoint2}.v - \text{RefPoint1}.v$$

$$\text{delta2} = pt2.v - pt1.v.$$

To superimpose a foreground object into a background with scale the initial, optional intermediate and end values for the position of the foreground with respect to the background are first set at the key frames, as shown in FIG. 5B for a first key frame. Given the key framed or interpolated values for the object, the scale factors are applied to the object then the object is inserted into the image. The scale factors used to scale an object are calculated with the following equation:

$$\text{scale factor} = \text{delta2}/\text{delta1}.$$

This operation results in the foreground object moving with the truck, as shown in FIGS. 5C–5D. If the purpose of the tracking was not to superimpose a foreground object, but to scale the background and keep the moving object the same size, the individual images of the sequence would be scaled according to the scale factor:

$$\text{scale factor} = \text{delta1}/\text{delta2}.$$

Figure 6C:
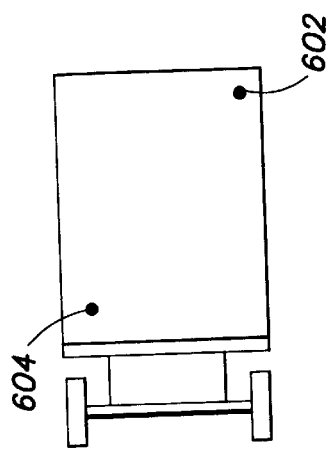
FIG. 6 illustrates tracking a moving image for rotation.
Figure 6B:
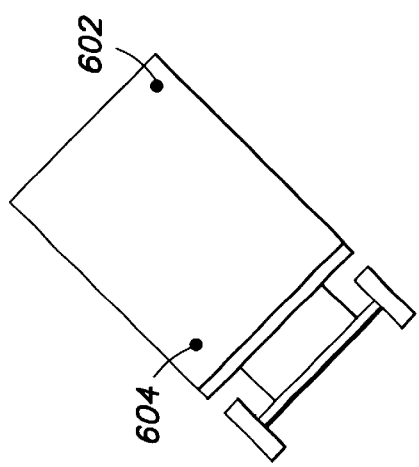
Figure 6A:
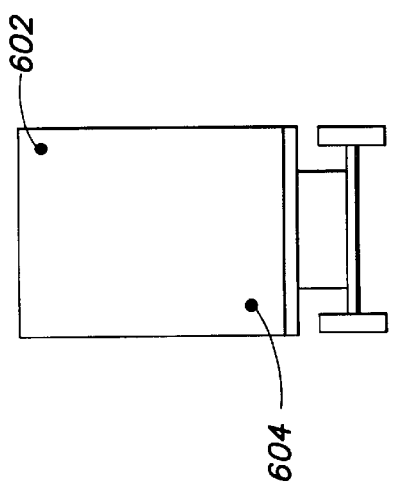

To insert a foreground object into a moving background where the background is rotated, as shown in FIG. 6, two tracking points may be used. The two points may be chosen anywhere in the moving background, but for best results should be far enough apart so they can adequately represent the rotation. The initial coordinates of these points 602, 604 are stored as reference points (RefPoint1.h, RefPoint1.v, RefPoint2.h, RefPoint2.v). For each subsequent field, shown in FIGS. 6B–6C, the coordinates of these tracking points are stored (pt1.h, pt1.v, pt2.h, pt2.v). The rotation effect for each image is determined using the following equations:

angle2=arc tan gent((pt2.v−pt1.v)/(pt2.h−pt1.h))

angle1=arc tan mgent((RefPoint2.v−RefPoint1.v)/(RefPoint2.h−RefPoint1.h))

angle2=angle2−angle1.

Figure 7D:
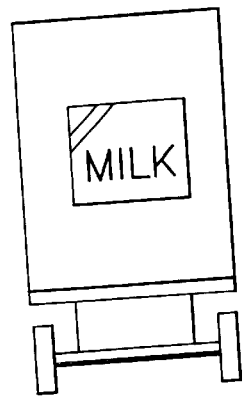
FIG. 7 illustrates inserting a foreground object into a moving image using a rotation effect.
Figure 7C:
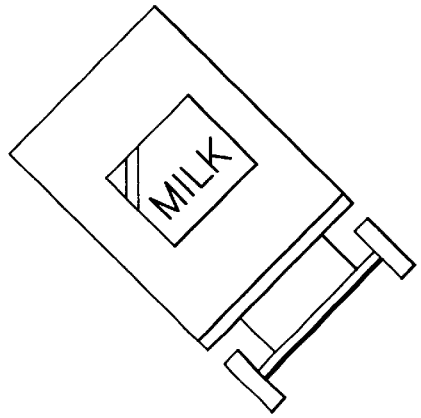
Figure 7B:
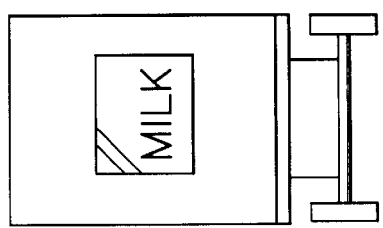
Figure 7A:

To superimpose a foreground object into a background with rotation the initial, optional intermediate and end values for the position of the foreground with respect to the background are first set at the key frames, as shown in FIG. 7B for a first key frame. Then rotation is applied to the object in each image using the following rotation angle computed for that image:

rotation angle=angle2.

This operation results in the foreground object rotating with the truck, as shown in FIGS. 7C–7D. If the purpose of the tracking was not to superimpose a foreground object, but to rotate the background and keep the moving object still, each image in the sequence would be subject to the following rotation:

rotation angle−angle2.

When tracking data is taken from a sequence of images in an interlaced media, undesired motion may appear in the tracking data due to the apparent movement of a point between the two fields that make up one image. To compensate for this apparent movement all tracking data taken from the second field of an interlaced image is shifted by half a line. In particular, for NTSC images the second field is shifted up half a line. For PAL images the second field is shifted down half a line.

The editor can create effects using the tracking data by either using the tracking data of the points to create position, rotation or scale effects or may use the tracking data combined into a transformation matrix. If isolated effects such as rotation or scale are desired, tracking points may be associated directly with those parameters. If matching the background movement as accurately as possible is desired, a transformation matrix may provide better results.

A transformation matrix is capable of using the tracking data of several points to create more detailed tracking effects. The matrix uses the tracking data to more accurately duplicate the motion of a tracked image, depending on the number of tracking points used. If one tracking point is used the matrix can be used to perform position transformations. If two tracking points are used the matrix can be used to perform position, scale and rotation transformations. If three tracking points are used the matrix can be used to perform position, scale, rotation and skew transformations. If four tracking points are used the matrix will perform position, scale, rotation, skew and perspective transformations. The inverse of the transformation matrix can be used for stabilization effects. Some digital video effects (DVE) processors use such a transformation matrix to define an effect to be performed on an image and can be used to perform effects in real time as described in U.S. Pat. No. 5,654,737. For each image a transformation matrix is loaded into the DVE processor.

The 3×3 transformation matrix M is created which represents the motion determined by the tracking data. The use of one to four tracking points is allowed. First the tracking data for the current field is obtained (pt1, pt2, pt3, pt4). The tracking data at the reference point is obtained (RefPoint1, RefPoint2, RefPoint3, RefPoint4). Based on the number of tracking points being used, a transformation matrix is determined by the motion of the tracking data from the reference point to the current field. The number of tracking points determine the coefficients of the transformation matrix M $$M = \begin{vmatrix} A & D & G \\ B & E & H \\ C & F & I \end{vmatrix}$$

Given the initial and current position of a single point, a translation between them can be uniquely determined. This case is the same as the object replacement discussed above. The transformation here becomes $$A = 1 \quad D = 0 \quad G = 0$$

$$B = 0 \quad E = 1 \quad H = 0$$

$$C = X \quad F = Y \quad I = 1$$

Given the initial position in a first image and current position in a subsequent image, defined using two points, a linear transformation between them can be uniquely determined. It is assumed here that the motion is that of a rigid body undergoing planar motion; i.e. no skew, only rotation, translation and scale. A translation of two points is accomplished in the following manner:

The distance between RefPoint1 and RefPoint2 is set as d, and the distance between pt1 and pt2 is set as r. A third reference point, RefPoint3, is added at a distance of d from RefPoint2, in a direction perpendicular to the vector from RefPoint1 to RefPoint2. A third current point, pt3, is added at a distance r from pt2, in a direction erpendicular to the vector from pt1 to pt2. Then the problem is treated as a three point ranslation as discussed below.

Given the initial position in a first image and current position in a subsequent image, defined using three points, an affine transformation between them can be uniquely determined. The transformation matrix is determined by solving the following set of simultaneous equations:

RefPoint1.h ∗ A + RefPoint1.v ∗ B + C = pt1.h

RefPoint2.h ∗ A + RefPoint2.v ∗ B + C = pt2.h

RefPoint3.h ∗ A + RefPoint3.v ∗ B + C = pt3.h

RefPoint1.h ∗ D + RefPoint1.v ∗ E + F = pt1.v

RefPoint2.h ∗ D + RefPoint2.v ∗ E + F = pt2.v

RefPoint3.h ∗ D + RefPoint3.v ∗ E + F = pt3.v

And $G = H = 0, I = 1$

Given the initial and current positions for four points, a projective transformation between them can be uniquely determined. Finding such a transformation which maps from one quadrilateral to another is straight forward; see for example the description in *Fundamentals of Texture Mapping and Image Warping,* Paul Heckbert, Master's thesis, UCB/CSD 89/516, CS Division, U.C. Berkeley, June 1989, hereby incorporated by reference.

Figure 8:
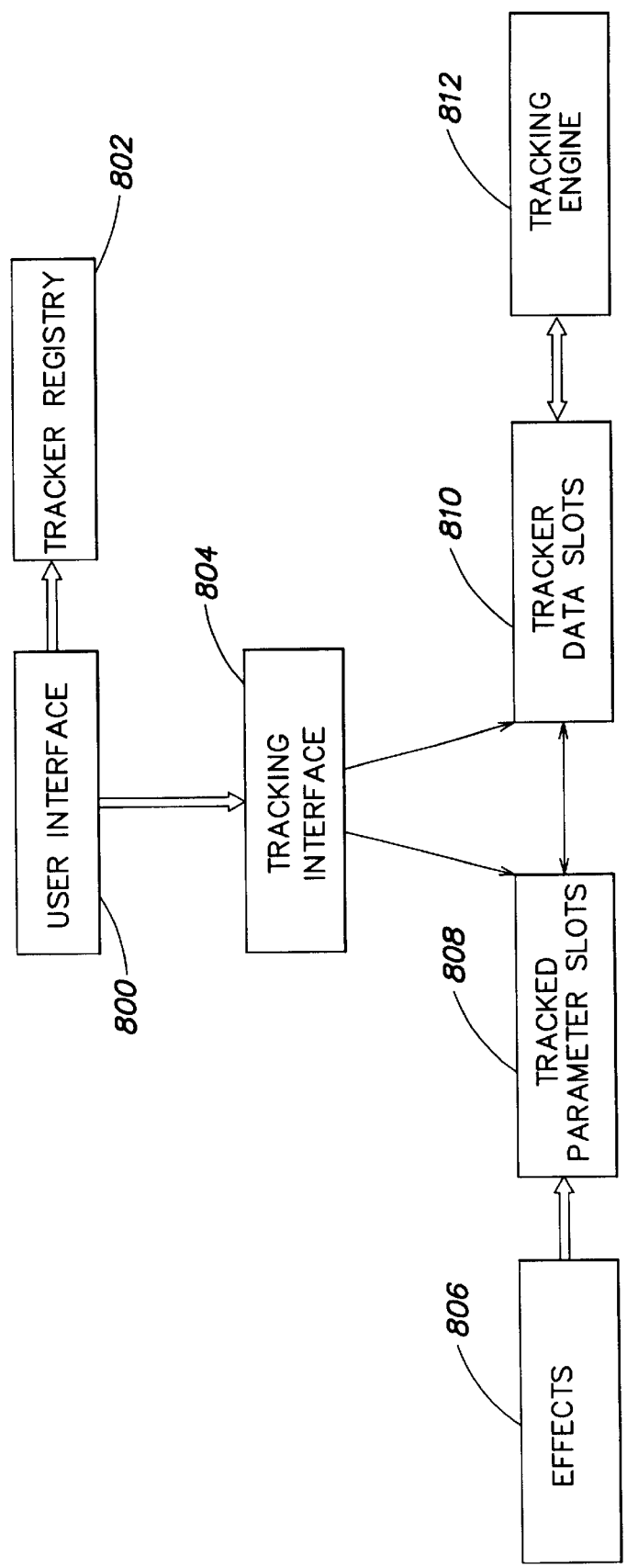
FIG. 8 is an architecture diagram of the tracking level functionality.

FIG. 8 shows an example architecture of how tracking information may be handled. Tracking information is grouped according to an individual tracker. Tracking information includes tracked data points, confidence value, tracker type, location and sizes of search and pattern rectangles, ranges tracked and untracked, and other information associated with trackers. Access to the groups of tracking information is controlled by tracker data slots 810. The tracker data slots 810 map between the tracker number of user interface 800 and the respective slot number of the tracker. Trackers are instantiated by the tracker registry 802 at the request of the tracker data slots 810. The tracker data slots object 810 is responsible for managing the tracking engines 812 and the tracking data they produce.

The tracker registry 802 isolates the user interface 800 from interacting directly with the tracking engine 812. The tracker registry 802 keeps a list of, and allows for the use of different tracking engines 812. Tracked parameter slots 808 controls access to the tracked parameter groups. Each tracked parameter group manages the information associated with a single effect parameter that is utilizing tracking, such as which effect the parameter represents and whether the use of tracking information is currently enabled. The tracked parameter group also contains other information such as references to the contributing tracker, the rules for combining the tracked data points into one parameter point, and other information. The tracked parameter slots 808 map between the tracked parameter group number of the user interface 800 and the respective slot number of the parameter group. Through the tracked parameter slots object 808 the effects 806 can determine which of its parameters are currently using tracking and what their tracked parameter values are.

The tracking interface 804 provides facilities for creating trackers, mapping trackers to effect parameters, performing tracking, etc. The tracking interface 804 creates objects which group the tracked parameter slots and tracker data slots that are associated with a particular effect. The tracking interface 804 generally passes requests to it on to the tracked parameter slots object 808 or the tracker data slots object 810.

Having now described an embodiment of the invention, it should be apparent that the foregoing is merely illustrative and not limiting, having been presented by way of example only. Numerous modifications and other embodiments are contemplated as falling within the scope of the invention.

What is claimed is:

1. A method for generating in real time an effect that is specified by key frames on video data comprising a sequence of images using tracking information, comprising:

for each image that is not a key frame, interpolating one or more values for parameters for the effect using one or more values that are specified at the key frames;

combining the tracking information with the one or more interpolated values;

performing the effect on each image in the sequence of images in real time using the combined tracking information and one or more interpolated values.

2. A method for generating an effect that is specified by key frames on video data comprising a sequence of images using tracking information, comprising:

for each image that is not a key frame, interpolating one or more values for parameters for the effect using one or more values that are specified at the key frames;

combining the tracking information with the one or more interpolated values;

performing the effect on each image using the combined tracking information and one or more interpolated values.

3. A method for generating an effect in real time on video data comprising a sequence of images using tracking information, comprising:

for each image, determining one or more values for parameters for the effect using the tracking information;

performing the effect on each image in the sequence of images in real time using the determined one or more values.

4. The method of claim 1, wherein the effect is insertion of a foreground object into a background in the sequence of images, wherein the tracking information defines movement of an object in the background, wherein the combining the tracking information with the one or more interpolated values includes determining a transformation matrix defining a transform between an initial position of the object in the background in a first image in the sequence of images and a current position of the object in the background in the image; and wherein the performing the effect includes using the transformation matrix to perform the effect.

5. The method of claim 4, wherein the tracking information includes two points and the transformation is a linear transformation.

6. The method of claim 4, wherein the tracking information includes three points and the transformation is an affine transformation.

7. The method of claim 4, wherein the tracking information includes four points and the transformation is a projective transformation.

8. The method of claim 2, wherein the effect is insertion of a foreground object into a background in the sequence of images, wherein the tracking information defines movement of an object in the background, wherein the combining the tracking information with the one or more interpolated values includes determining a transformation matrix defining a transform between an initial position of the object in the background in a first image in the sequence of images and a current position of the object in the background in the image; and wherein the performing the effect includes using the transformation matrix to perform the effect.

9. The method of claim 8, wherein the tracking information includes two points and the transformation is a linear transformation.

10. The method of claim 8, wherein the tracking information includes three points and the transformation is an affine transformation.

11. The method of claim 8, wherein the tracking information includes four points and the transformation is a projective transformation.

12. The method of claim 3, wherein the effect is insertion of a foreground object into a background in the sequence of images, wherein the tracking information defines movement of an object in the background, wherein the determining the one or more values for the parameters of the effect includes determining a transformation matrix defining a transform between an initial position of the object in the background in a first image in the sequence of images and a current position of the object in the background in the image; and wherein the performing the effect includes using the transformation matrix to perform the effect.

13. The method of claim 12, wherein the tracking information includes two points and the transformation is a linear transformation.

14. The method of claim 12, wherein the tracking information includes three points and the transformation is an affine transformation.

15. The method of claim 12, wherein the tracking information includes four points and the transformation is a projective transformation.

16. A method for applying an effect to a sequence of images, comprising:

receiving tracking information indicating movement of an object from one image to another image in the sequence of images;

receiving parameters for the effect specified by values associated with key frames in the sequence of images;

for each image in the sequence of images that is not a key frame, interpolating one or more values that are associated with the key frames to obtain values specifying the parameters for the effect for the image;

for each image in the sequence of images, combining the tracking information with the parameters for the effect for the image to obtain modified parameters for the effect for the image; and performing the effect on each image in the sequence of images for display of the sequence of images in real time using the modified parameters for the effect for the image.

17. The method of claim 16, wherein the effect is insertion of a foreground object into a background in the sequence of images, wherein the tracking information defines movement of an object in the background, wherein the combining the tracking information with the parameters for the effect for the image includes determining a transformation matrix defining a transform between an initial position of the object in the background in a first image in the sequence of images and a current position of the object in the background in the image; and wherein the performing the effect includes using the transformation matrix to perform the effect.

18. The method of claim 17, wherein the tracking information includes two points and the transformation is a linear transformation.

19. The method of claim 17, wherein the tracking information includes three points and the transformation is an affine transformation.

20. The method of claim 17, wherein the tracking information includes four points and the transformation is a projective transformation.

21. A computer program product, comprising:

a computer readable medium computer program instructions stored on the computer readable medium that, when executed by a computer, instruct the computer to perform a method for applying an effect to a sequence of images, comprising:

receiving tracking information indicating movement of an object from one image to another image in the sequence of images;

receiving parameters for the effect specified by values associated with key frames in the sequence of images;

for each image in the sequence of images that is not a key frame, interpolating one or more values that are associated with the key frames to obtain values specifying the parameters for the effect for the image;

for each image in the sequence of images, combining the tracking information with the parameters for the effect for the image to obtain modified parameters for the effect for the image; and performing the effect on each image in the sequence of images for display of the sequence of images in real time using the modified parameters for the effect for the image.

22. The computer program product of claim 21, wherein the effect is insertion of a foreground object into a background in the sequence of images, wherein the tracking information defines movement of an object in the background, wherein the combining the tracking information with the parameters for the effect for the image includes determining a transformation matrix defining a transform between an initial position of the object in the background in a first image in the sequence of images and a current position of the object in the background in the image; and wherein the performing the effect includes using the transformation matrix to perform the effect.

23. The computer program product of claim 22, wherein the tracking information includes two points and the transformation is a linear transformation.

24. The computer program product of claim 22, wherein the tracking information includes three points and the transformation is an affine transformation.

25. The computer program product of claim 22, wherein the tracking information includes four points and the transformation is a projective transformation.

26. An apparatus for applying an effect to a sequence of images according to tracking information indicating movement of an object from one image to another image in the sequence of images and parameters for the effect specified by values associated with key frames in the sequence of images, comprising:

means for obtaining, for each image in the sequence of images that is not a key frame, values specifying the parameters for the effect for the image by interpolating one or more values that are associated with the key frames;

means for modifying, for each image in the sequence of images, the parameters for the effect for the image using the tracking information to obtain modified parameters for the effect for the image; and means for applying the effect on each image in the sequence of images for display of the sequence of images in real time using the modified parameters for the effect for the image.

27. The apparatus of claim 26, wherein the effect is insertion of a foreground object into a background in the sequence of images, wherein the tracking information defines movement of an object in the background, wherein the means for modifying the parameters of the effect using the tracking information for an image includes means for determining a transformation matrix defining a transform between an initial position of the object in the background in a first image in the sequence of images and a current position of the object in the background in the image; and wherein the means for applying the effect includes means for using the transformation matrix to perform the effect.

28. The apparatus of claim 27, wherein the tracking information includes two points and the transformation is a linear transformation.

29. The apparatus of claim 27, wherein the tracking information includes three points and the transformation is an affine transformation.

30. The apparatus of claim 27, wherein the tracking information includes four points and the transformation is a projective transformation.

31. An apparatus for applying an effect to a sequence of images, comprising:

a tracking engine having an input for receiving the sequence of images and an output providing tracking information indicating movement of an object from one image to another image in the sequence of images;

an effects interface having an input through which a user specifies key frames in the sequence of images and values associated with each key frame, wherein the values specify parameters for the effect, and having an output providing an indication of the key frames and the values associated with each key frame; and a real time effects generator, having an input for receiving the indication of the key frames and the values associated with each key frame and an input for receiving the tracking information, and including:

means for obtaining, for each image in the sequence of images that is not a key frame, values specifying the parameters for the effect for the image by interpolating one or more values that are associated with the key frames;

means for modifying, for each image in the sequence of images, the parameters for the effect for the image using the tracking information to obtain modified parameters for the effect for the image; and means for applying the effect on each image in the sequence of images for display of the sequence of images in real time using the modified parameters for the effect for the image.

32. The apparatus of claim 31, wherein the effect is insertion of a foreground object into a background in the sequence of images, wherein the tracking information defines movement of an object in the background, wherein the means for modifying the parameters of the effect using the tracking information for an image includes means for determining a transformation matrix defining a transform between an initial position of the object in the background in a first image in the sequence of images and a current position of the object in the background in the image; and wherein the means for applying the effect includes means for using the transformation matrix to perform the effect.

33. The apparatus of claim 32, wherein the tracking information includes two points and the transformation is a linear transformation.

34. The apparatus of claim 32, wherein the tracking information includes three points and the transformation is an affine transformation.

35. The apparatus of claim 32, wherein the tracking information includes four points and the transformation is a projective transformation.

* * * * *